United States Patent [19]

Lüpertz

[11] 4,256,209
[45] Mar. 17, 1981

[54] AXIALLY DISPLACEABLE BRAKE DISC

[75] Inventor: Hans-Henning Lüpertz, Darmstadt, Fed. Rep. of Germany

[73] Assignee: ITT Industries, Inc., New York, N.Y.

[21] Appl. No.: 3,185

[22] Filed: Jan. 15, 1979

[30] Foreign Application Priority Data

Feb. 22, 1978 [DE] Fed. Rep. of Germany ....... 2807485

[51] Int. Cl.³ .............................................. F16D 65/12
[52] U.S. Cl. ................. 188/218 XL; 64/27 LS; 64/12; 192/106.1
[58] Field of Search ........... 188/218 XL, 218 A, 73.2; 192/70.17, 70.19, 70.2, 106.1; 64/27 R, 27 CS, 27 L, 29, 12, 13, 23, 27 B

[56] References Cited

U.S. PATENT DOCUMENTS

| 1,959,213 | 5/1934 | Nygard | 192/106.1 |
| 3,650,361 | 3/1972 | Fossum | 192/106.1 |
| 3,754,624 | 8/1973 | Eldred | 192/106.1 |
| 4,043,437 | 8/1977 | Taylor | 188/218 XL |
| 4,118,953 | 10/1978 | Kavolelis et al. | 64/12 |

FOREIGN PATENT DOCUMENTS

| 1575840 | 1/1970 | Fed. Rep. of Germany | 188/218 XL |
| 933467 | 4/1948 | France | 192/106.1 |
| 1132375 | 10/1968 | United Kingdom | 188/218 XL |

Primary Examiner—Edward R. Kazenske
Attorney, Agent, or Firm—John T. O'Halloran; Alfred C. Hill

[57] ABSTRACT

A brake disc is connected to a hub to be braked in a non-rotatable and axially displaceable relationship by an elastic soft steel band disposed between and frictionally engaging arcuate projections of the hub and arcuate projections of the brake disc which are disposed between the projections of the hub. With this arrangement the axial displacement of the disc will not require high forces and will not be impaired by corrosion or high temperatures.

13 Claims, 1 Drawing Figure

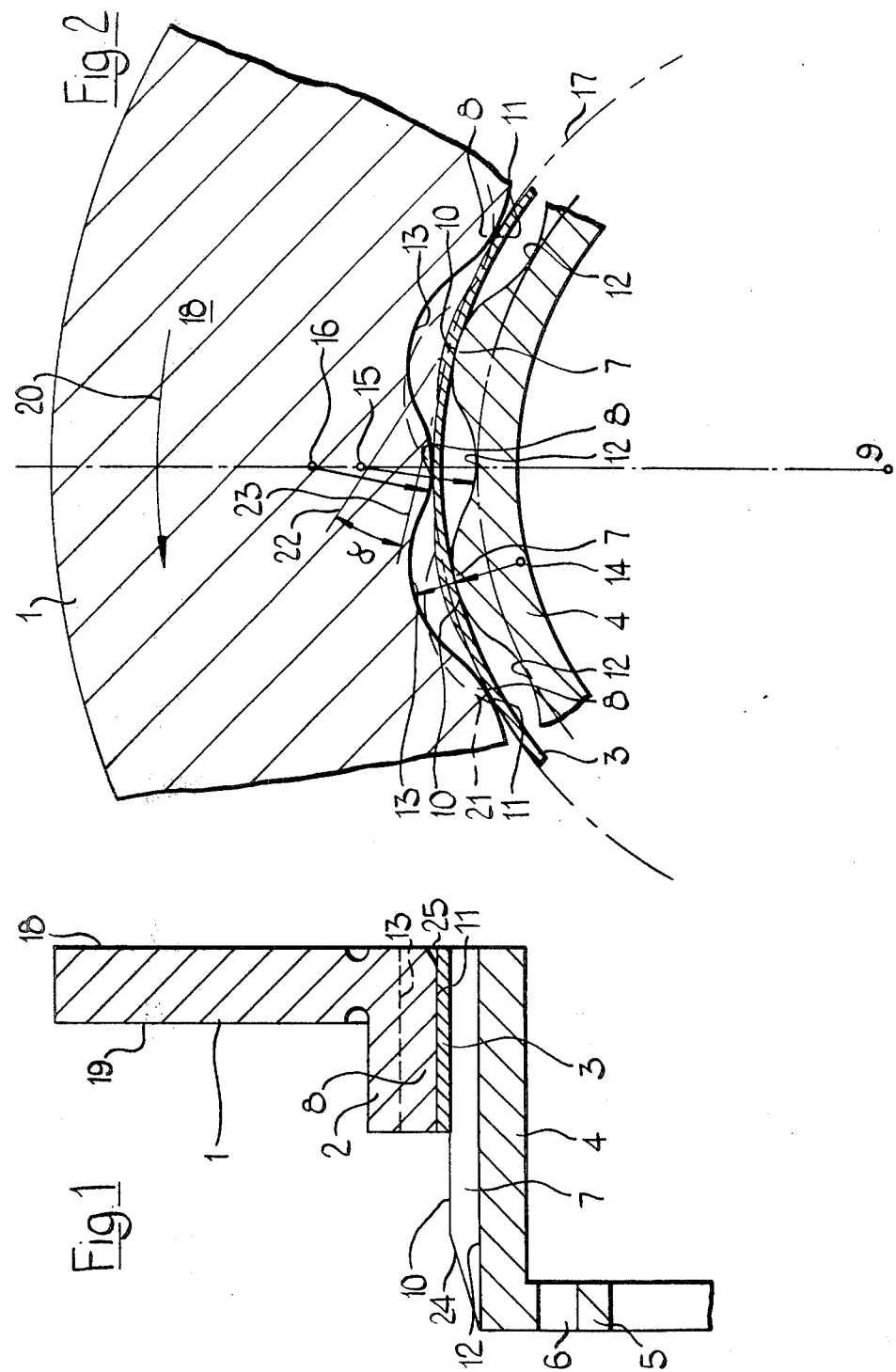

AXIALLY DISPLACEABLE BRAKE DISC

BACKGROUND OF THE INVENTION

The present invention relates to a brake disc, in particular for motor vehicles, that is non-rotatably and axially displaceably connected with a hub to be braked.

Brake discs of this type are required for disc brakes with an actuation device arranged on one side of the brake disc, only, which, by means of a displaceable defriction lining on one side of the brake disc actuated by the actuation device, will press the brake disc against an undisplaceably arranged friction pad on the other side of the brake disc. In such brake discs, there exist special requirements with regard to the connection between the brake disc and the hub. This connection has to ensure an easy axial displaceability of the brake disc, on the one hand, yet serve for the transmission of high torque forces, on the other hand.

In German Utility Pat. (Dt-GM) No. 7,012,103 there is disclosed an axially displaceable brake disc having radially extending projections which project into recesses of the hub and come into mesh with radially aligned guide surfaces of the hub. Further, leaf springs are provided opposite the hub for the centering of the brake disc, the springs being connected at the hub and acting on outside surfaces of the projections which are cylindrical in respect to the axis of rotation of the brake disc.

This known brake disc is disadvantageous in that in case of small torques there will be an engagement of the torque transmission surfaces at the projections and the hub, and, thus, any axial displacement of the brake disc with respect to the hub is possible only against the frictional drag caused by the transmitted torque. Due to the influence of dirt, the frictional drag may develop such proportions that the displaceability of the brake disc will be impaired considerably and the brake shoes arranged on both sides of the brake disc will be exposed to uneven wear.

SUMMARY OF THE INVENTION

An object of the present invention is to provide a brake disc of the type referred to above which requires only a small force for the axial displacement thereof and the displaceability of which will not be impaired by corrosion and temperature influences.

A feature of the present invention in the provision of an arrangement to connect a brake disc to a hub to be braked in a non-rotatable and axially displaceable relationship comprising: a first plurality of projections disposed on the disc extending toward the hub, each of the first plurality of projections having first end faces aligned parallel to an axis of rotation of the disc and the hub; a second plurality of projections disposed on the hub extending toward and in a staggered relationship with the first plurality of projections, each of the second plurality of projections having second end faces aligned parallel to the axis of rotation; and a preloaded elastic band disposed between and frictionally engaging each of the first and second end faces so that a rotational displacement of the disc due to braking torque will lead to an increase in the preloading of the band.

The invention brake disc ensures that, upon the onset of a braking action, the elastic band, in frictional engagement, will transmit the torque force, which at first is small, from the brake disc to the hub. With increasing torque force, there will be a relative movement between the brake disc and, respectively, the elastic band and the hub in the circumferential direction, the relative movement resulting in a more pronounced deformation of the elastic band and, thus, in an increase of the normal forces which are acting on the frictional engagement between the brake disc and the hub until, in the extreme case, there will be a positive engagement. The relative movement serves to overcome the frictional forces between the brake disc and the hub. consequently, small forces which are acting on the brake disc in the axial direction will be sufficient to bring about an axial deflection of the relative movement of the brake disc. The invention is based on the consideration that the hub will cease to transmit any further guiding forces to the brake disc in the axial direction as soon as the frictional engagement between the brake disc and the hub has been overcome. Therefore, when in frictional engagement, the inventive brake disc will still be able to move axially, even in the event of high frictional forces, in order to be capable of compensating for the compressibility and the wear of the brake lining as well as to the expansion of the brake caliper. A special advantage of the inventive brake disc further includes that the relative movements ensuing upon any braking action will entail a self-cleaning effect thanks to which any corrosion and dirt particles will be removed. Further, the inventive brake disc is temperature-stable since it will not need any temperature-sensitive materials and since the frictional engagement between the hub and the brake disc is characterized by a great radial elasticity. If the brake disc is worn out, it may be easily replaced. The brake disc can be moved off the hub without the hub having to be screwed off the wheel.

In an advantageous embodiment of the inventive brake disc the end faces of the projections of the brake disc and of the hub arranged at approximately the same distance with regard to the axis of rotation of the brake disc. In this embodiment, a positive engagement will be possible only by means of the elastic band fixed between the brake disc and the hub. The advantage of this embodiment primarily incudes a small bend of the elastic band and in using its flexural strength for achieving the required frictional engagement.

When using an elastic band of small flexural strength, it will be advantageous if, with regard to a tangent, the distance of the end faces of the radially outward projections is less than the thickness of the elastic band, the tangent connecting the end faces of two adjacent radially inward projections.

The end faces of the projections will preferably be cylindrical. This design will ensure that the notch effect on the elastic band will be small. It will be especially advantageous if the end faces of the projections are also connected by means of cylindrical interfaces of opposite curvature. In this way, it will be possible to keep the notch effect small that will act on the hub and the brake disc. Further, an easy manufacture by means of e.g. broaching will be possible.

The elastic band is preferably made of soft steel. The maximum deformation and length of the elastic band are advantageously coordinated such as to ensure that the strain will remain below the yield point of the material.

It will be particularly advantageous if the number of the projections at the brake disc and the hub is uneven which will counteract the formation of vibrations caused by friction during the braking action, such vibrations tending to bring about symmetrical deformations.

With respect to the design of the projections, it will be further advantageous if confronting end faces and interfaces each have a common center line. From this design smaller radii of curvature will ensue for the end faces of the projections which will promote a return movement of the brake disc into its initial position after the release of the brake. In order to carry the elastic band along with the brake disc in the axial direction, the elastic band may be positively connected with one or several points of the brake disc, or, as seen in the direction of axial displacement, the brake disc may have a shoulder at its rear end, the shoulder projecting beyond the projections and serving as stop for the elastic band.

In order to facilitate the assembly of the brake disc and the hub, the axial ends of the end faces of the brake disc and/or of the hub are chamfered at an angle of less than 45 degrees.

The curvature of the end faces of the projections and its arrangement in the radial direction are preferably of such a nature that, upon the maximum deformation of the elastic band, the tangent at the center of the contact surface between the projections of the brake disc and the elastic band will form an angle with respect to the direction of movement of this point of the brake disc's contact surface, the angle exceeding the friction angle formed between the brake disc and the band. In such an embodiment of the inventive brake disc, the elastic band's preloading will be sufficient in order to move the brake disc back into its initial position with respect to the hub after the release of the brake.

The normal forces achieved by the preloading of the elastic band between the band and, respectively, the hub and the brake disc, are, as a rule, sufficient in order to bring about a reliable centering of the brake disc with respect to the hub. In some applications, however, an additional centering may be desired. To this end, the invention proposes to arrange the hub or the brake disc so that, by means of surfaces which are cylindrical with respect to the axis of rotation of the brake disc, it will lie on three or more projections of the respective counterpart.

BRIEF DESCRIPTION OF THE DRAWING

Above-mentioned and other features and objects of this invention will become more apparent by reference to the following description taken in conjunction with the accompanying drawing, in which:

FIG. 1 is a radial section taken through a brake disc in accordance with the principles of the present invention; and FIg. 2 is a view of a detail of the brake disc of FIG. 1, the view being in the direction of the axis of rotation of the brake disc.

DESCRIPTION OF THE PREFERRED EMBODIMENT

The brake disc 1 illustrated in FIGS. 1 and 2 has a cylindrical foot 2 which is resting on an elastic band 3. Band 3 will be borne by a hub 4 that may be fixed at a rotary component, such as e.g. the wheel hub of a vehicle, by means of an annular flange 5 and bores 6. Hub 4 and brake disc 1 have confronting projections 7 and 8, respectively, provided with cylindrical end faces 10 and 11 that are aligned parallel with the axis of rotation 9. The number and the spacing of projections 7 and 8 of hub 4 and of brake disc 1 are the same. Between the projections, there are cylindrical interfaces 12 and 13 of opposite curvature. In the position shown in FIG. 2, end faces 10 and interfaces 13 have common center lines 14. The center line of interfaces 12 is designated by the numeral 15 and the center line of end faces 11 is indicated by the numeral 16.

The arrangement of projections 7 and 8 is such as to ensure that the largest distance of end faces 10 with respect to the axis of rotation 9 equals the smallest distance of end faces 11 with respect to the axis of rotation 9. The numeral 17 indicates the circular arc described around the axis of rotation 9 which will barely touch end faces 10 and 11.

Elastic band 3 arranged in the space between hub 4 and brake disc 1 lies on end faces 10 of hub 4 and on end faces 11 of brake disc 1. Since the thickness of elastic band 3 exceeds the polar distance of end faces 10 and 11 with respect to the axis of rotation 9, its shape is deviating from that of circular arc 17. Due to the preloading of elastic band 3, a radially aligned normal force ensues at the contact between elastic band 3 and end faces 10 and 11, this normal forces ensuring a centering of brake disc 1 with respect to hub 4 and brings about a frictional engagement by means of which brake disc 1 is carried along by hub 4 in the direction of rotation.

Upon a braking action, at first, one brake shoe is pressed against the friction surface 18 of brake disc 1. Due to this frictional engagement, a torque force is generated in correspondence with the vector 20 illustrated in FIG. 2 and will at first be transmitted by frictional engagement from brake disc 1 to hub 4 via band 3. With increasing torque force 20 due to an increase of the braking pressure, the frictional engagement between brake disc 1 and band 3 or even between band 3 and hub 4 will be overcome whereupon a relative movement of brake disc 1 will ensue with respect to hub 4. Since torque force 20 will be generated by a contact force acting on friction surface 18 in the direction of the axis of rotation, the relative movement of brake disc 1 is not only subject to the action of torque force 20 but also to that of the contact force directed in the axial direction. Consequently, brake disc 1 shifts in the circumferential and in the axial directions. The displacement in the axial direction will cause the friction surface 19 of brake disc 1 to come into engagement with a further brake shoe which features an undisplaceable arrangement. As the loading of elastic band 3 increases, a further increase of torque force 20 will finally bring about the position of brake disc 1 with respect to hub 4 illustrated by the broken line 21. In this position, there will result a positive engagement between projections 7 and 8 by means of band 3, the positive engagement being suitable for the transmission of high torque forces.

The line 22 forms a tangent at the center of the contact surface between projections 8 and band 3 in the position of brake disc 1 illustrated by broken line 21. The line 23 represents the direction of the movement of the center of the contact surface at projections 8 and is a tangent with respect to a circular arc around the axis of rotation 9. Lines 22 and 23 form the angle alpha. If this angle exceeds the frictional angle rho or the two engaging frictional materials of band 3 and projections 8, the loading force of band 3 will suffice to turn brake disc 1 back in a direction opposed to vector 20 after the release of the brake, as a result of which the above described process may be repeated upon a new actuation of the brake.

In order to facilitate the assembly of brake disc 1 and of hub 4, the latter has a chamfer 24 of less than 45 degrees and brake disc 1 has a chamfer 25 of less than 45 degrees. The assembly is performed in such a way that at first elastic band 3 is slipped on to projections 7 of hub 4 via chamfer 24. Subsequently, brake disc 1 will be slipped from the left-hand side, as viewed in FIG. 1 on to elastic band 3 whereby a preloading will be brought about in elastic band 3, the preloading being necessary in order to achieve the required frictional engagement.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to connect a brake disc to a hub to be braked in a non-rotatable and axially displaceable relationship comprising:
    a first plurality of projections disposed on said disc extending toward said hub, each of said first plurality of projections having a first end face aligned parallel to an axis of rotation of said disc and said hub;
    a second plurality of projections disposed on said hub extending toward and in a staggered relationship with said first plurality of projections, each of said second plurality of projections having a second end face aligned parallel to said axis of rotation, said first and second end faces being disposed on a common circular arc coaxial with said axis of rotation and disposed between said first and second plurality of projections; and
    a preloaded elastic band slightly deviated from said common circular arc disposed between and frictionally engaging only each of said first and second end faces so that a rotational displacement of said disc due to braking torque will lead to an increase in the preloading of said band by each of said first plurality of projections causing a further deviation of said band from said common circular arc toward said hub between each adjacent two of said second plurality of projections.

2. An arrangement according to claim 1, wherein the distance between a tangent connecting two adjacent ones of said second end faces and a tangent connecting two adjacent ones of said first end faces is less than the thickness of said band.

3. An arrangement according to claim 1, wherein said first and second end faces are cylindrical.

4. An arrangement according to claim 3, wherein adjacent ones of each of said first and second end faces are connected by a cylindrical interface of opposite curvature.

5. An arrangement according to claim 4, wherein said first end faces have a first center line and said interfaces connecting said second center line spaced from said first center line.

6. An arrangement according to claim 4, wherein said second end faces and said interfaces connecting said first end faces have a common center line.

7. An arrangement according to claim 6, wherein said first end faces have a first center line and said interfaces connecting said second end faces have a second center line spaced from said first center line.

8. An arrangement according to claim 1, wherein said band is made of soft steel.

9. An arrangement according to claim 1, wherein the maximum deformation and the length of said band are coordianted such as to ensure that the strain on said band will remain below the yield point of the material from which said band is made.

10. An arrangement according to claim 1, wherein each of said first and second plurality of projection have an uneven number of projections.

11. An arrangement according to claim 1, wherein said band is carried by said disc when said disc is axially displaced.

12. An arrangement according to claim 1, wherein at least one end of said first end faces and the other end of said second end faces are chamfered at an angle of less than 45 degrees.

13. An arrangement according to claim 1, wherein a given angle is formed between a first tangent to the center of contact surfaces between said first end faces and said band at minimum deformation of said band and a second tangent to the center of said contact surfaces at maximum deformation of said band, said given angle exceeding a friction angle formed between said disc and said band.

* * * * *